United States Patent

Focke

Patent Number: 5,269,646
Date of Patent: Dec. 14, 1993

[54] PROCESS AND INSTALLATION FOR THE REARRANGEMENT OF ARTICLES PALLETISED ACCORDING TO SORTS TO FORM GROUPS OF SPECIFIC SORT COMPOSITION

[75] Inventor: Heinz Focke, Verden, Fed. Rep. of Germany

[73] Assignee: Focke & Co. (GmbH & Co.), Verden, Fed. Rep. of Germany

[21] Appl. No.: 895,453

[22] Filed: Jun. 8, 1992

Related U.S. Application Data

[63] Continuation of Ser. No. 516,945, Apr. 30, 1990, abandoned.

[30] Foreign Application Priority Data

May 9, 1989 [DE] Fed. Rep. of Germany ....... 3915139

[51] Int. Cl.⁵ .............................. B65G 60/00
[52] U.S. Cl. .................. 414/796.2; 414/786; 414/788.4; 414/788.7; 414/789.6; 414/790.9; 414/796.3
[58] Field of Search .......... 198/347.1, 453, 442, 198/445; 414/788.4, 788.7, 796.2, 796.3, 796.4, 927, 790.9, 786

[56] References Cited

U.S. PATENT DOCUMENTS

| | | | |
|---|---|---|---|
| 2,877,883 | 3/1959 | Lanham | 198/445 |
| 3,031,906 | 5/1962 | Holman | 414/927 X |
| 3,115,961 | 12/1963 | Layton, Jr. | 198/442 X |
| 3,139,965 | 7/1964 | Eggert | 198/442 X |
| 3,206,041 | 9/1965 | McGrath | 414/796.8 |
| 3,724,687 | 4/1973 | Marschke et al. | 414/797 |
| 3,917,082 | 11/1975 | Howard et al. | 414/796.2 X |
| 4,019,620 | 4/1977 | Frenkel et al. | 414/796.3 X |
| 4,929,147 | 5/1990 | Jenkner | 414/927 X |

FOREIGN PATENT DOCUMENTS

| | | |
|---|---|---|
| 84763 | 8/1983 | European Pat. Off. . |
| 111848 | 6/1984 | European Pat. Off. . |
| 209116 | 1/1987 | European Pat. Off. ........ 198/347.1 |
| 240812 | 10/1987 | European Pat. Off. . |
| 911231 | 5/1954 | Fed. Rep. of Germany ...... 198/445 |
| 1232069 | 1/1967 | Fed. Rep. of Germany . |
| 1251230 | 9/1967 | Fed. Rep. of Germany . |

(List continued on next page.)

OTHER PUBLICATIONS

"Versandarbeit in Einem Pharmazeutischen Gossbetrieb Wirkungsvoll Vereinfacht", dhf 11, Nov. 1968, pp. 79-80.
"Zusammanführen und Verteilen", *Fordermittel Journal*, Nov. 1988, p. 30.
*Fordermittel Journal*, Oct. 1988, p. 30.
*Manutention*, Jul. 1978, p. 38.
"Ways to Change Direction of Converyed Materials", Lee D. Miller, *Automation*, Sep. 1985, pp. 102, 106-111.
"Abstract of JP 60 102316", *Patents Abstracts of Japan*, vol. 9, No. 252, Oct. 9, 1985.
"Abstract of JP 58 104817", *Patents Abstracts of Japan*, vol. 7, No. 207, Sep. 13, 1983.

*Primary Examiner*—Michael S. Huppert
*Assistant Examiner*—Janice Krizek
*Attorney, Agent, or Firm*—Sughrue, Mion, Zinn, Macpeak & Seas

[57] ABSTRACT

For the rearrangement of articles of different sorts, which are deposited according to sorts on pallets, to form groups of articles of a plurality of sorts, each deposited on a base, pallets of the different sorts of articles are depalletised continuously in layers by delivering the depalletised articles to individual conveyors, whence the articles are transferred to a sort-conveyor intended for the particular sort of article and with an associated sort store and are intermediately stored in the latter (that is to say, according to sorts). Subsequently, the intermediately stored articles are discharged from the sort stores by the respective associated sort-conveyor in the number and sequence required for forming a group, and are fed to at least one group-forming station and in this are deposited on a base in the desired arrangement within the group to be formed.

36 Claims, 10 Drawing Sheets

FOREIGN PATENT DOCUMENTS

| | | |
|---|---|---|
| 268144 | 1/1969 | Fed. Rep. of Germany . |
| 1456850 | 3/1969 | Fed. Rep. of Germany . |
| 1708885 | 11/1970 | Fed. Rep. of Germany . |
| 2062845 | 7/1972 | Fed. Rep. of Germany . |
| 2152456 | 4/1973 | Fed. Rep. of Germany . |
| 2500786 | 7/1975 | Fed. Rep. of Germany . |
| 2419746 | 10/1975 | Fed. Rep. of Germany . |
| 2640867 | 3/1977 | Fed. Rep. of Germany ... 198/347.1 |
| 2843599 | 4/1979 | Fed. Rep. of Germany . |
| 2803320 | 8/1979 | Fed. Rep. of Germany ... 198/347.1 |
| 2830197 | 1/1980 | Fed. Rep. of Germany . |
| 2940819 | 4/1980 | Fed. Rep. of Germany . |
| 2855982 | 7/1980 | Fed. Rep. of Germany . |
| 2619156 | 9/1981 | Fed. Rep. of Germany . |
| 3025951 | 2/1982 | Fed. Rep. of Germany . |
| 3322302 | 12/1983 | Fed. Rep. of Germany . |
| 3347474 | 2/1985 | Fed. Rep. of Germany . |
| 3515595 | 10/1986 | Fed. Rep. of Germany . |
| 3524344 | 1/1987 | Fed. Rep. of Germany . |
| 3613462 | 10/1987 | Fed. Rep. of Germany . |
| 3638991 | 5/1988 | Fed. Rep. of Germany . |
| 3711605 | 10/1988 | Fed. Rep. of Germany . |
| 3720933 | 1/1989 | Fed. Rep. of Germany . |
| 159710 | 3/1983 | German Democratic Rep. . |
| 215058 | 3/1987 | German Democratic Rep. . |
| 577927 | 7/1976 | Switzerland . |
| 2107690 | 5/1983 | United Kingdom ............. 414/789.6 |

PROCESS AND INSTALLATION FOR THE REARRANGEMENT OF ARTICLES PALLETISED ACCORDING TO SORTS TO FORM GROUPS OF SPECIFIC SORT COMPOSITION

This is a continuation of application Ser. No. 07/516,945, filed Apr. 30, 1990, now abandoned.

BACKGROUND OF THE INVENTION

The invention relates to a process and an installation for the rearrangement of articles of different sorts, which are deposited on pallets, each of a specific sort of article, to form groups of articles of a plurality of sorts, each deposited on a base.

In the production of articles of mass consumption of different sorts, for example the production of sweets and chocolate articles, it is often impossible for various reasons to obtain a sales-related composition of the various sorts immediately after production. These articles are therefore first palletised according to sorts and later, if appropriate even elsewhere, have to be rearranged to form groups of a plurality of sorts. This rearrangement involves a high outlay in terms of time and labour.

SUMMARY OF THE INVENTION

The object on which the invention is based is, therefore, to provide a process and an installation, by means of which the said rearrangement can be carried out reliably and especially efficiently. At the same time, there will also basically be a guarantee that the composition of articles of different sorts can be changed within a group to be formed, that is to say there will be the possibility that short-term groups of changed composition can be formed, without having to change the process flow and the fundamental design of the installation to be provided.

In process terms, this object is achieved in that pallets of the different sorts of articles are fed continuously to at least one depalletising station, in that the pallets are depalletised in layers by delivering the articles to at least one individual conveying means, in that the articles delivered to the at least one individual conveying means are transferred to a cort-conveying means intended for the particular sort of article and with an associated sort store and are intermediately stored in the latter (that is to say, according to sorts), in that the intermediately stored articles are discharged from the sort stores by means of the respective associated sort-conveying means and fed to at least one group-forming station, and in that, in the at least one group-forming station, the articles fed to this are deposited in the requisite number and necessary sequence on a base in the desired arrangement within the group to be formed.

By means of this procedure, it is directly possible first to depalletise according to sorts articles which are supplied according to sorts on pallets, the depalletised articles being transferred into sort stores, that is to say being intermediately stored according to sorts once again. The articles are called up from the sort stores as needed for the composition of the desired groups, that is to say in the appropriate number and sequence, for example as a result of the actuation of corresponding control elements. The called-up articles, previously already located on sort-conveying means belonging to the respective sort stores, are subsequently fed to a group-forming station or, if required, even to a plurality of such stations, where the individual articles supplied for forming a group are deposited on a base in the desired geometrical arrangement relative to one another, so that thereafter a finished group of the desired composition is available. This rearrangement process can be directly executed continuously and under automatic control, so that it is necessary, at the at least one depalletising station, to allow only for the continuous feed of pallets of the different sorts of articles and, at the at least one group-forming station, to allow only for the feed of the bases and the discharge of the ready-formed groups. This procedure, in general, makes it possible to arrange a plurality of depalletising stations parallel to one another; likewise, a plurality of group-forming stations can be arranged parallel to one another, so that the efficiency of the process can be increased virtually as desired and especially matched to a, where appropriate, very large number of different sorts of articles. Also, in general, by virtue of the process structure there is the possibility of changing over briefly to another type of composition of the groups of articles of different sorts. For this, it is merely necessary to modify the call-up commands for the sort stores, in which, moreover, a minimum stock of articles of the respective sort is always maintained. At the same time, however, a particular maximum stock will also not be exceeded.

For the purpose of an intermediate storage truly according to sorts of the articles supplied in pallet form, it is necessary to ensure that only pallets of a specific number of different sorts of articles and only with articles of the sorts intended for the subsequent sort stores are fed to each depalletising station.

As a rule, within a pallet layer of articles supplied the articles are arranged in a plurality of rows. In these circumstances, it is recommended, in the region of the depalletising station, to provide for each row of articles of a pallet layer its own conveying means or to discharge the articles of individual rows via separate conveying means. If there are four parallel rows within a pallet layer, then four separate conveying means therefore have to be provided. In an expedient and advantageous development, these should be operated at a differing conveying speed. The conveying speeds can easily be coordinated with one another in such a way that the depalletised articles do not collide with one another. However, the essential purpose of the different conveying speed of the plurality of conveying means is to guide the individual articles in such a way that, at the end of the conveying zone, they can be combined to form a single conveying stream of articles, specifically into a so-called close-packed position in which each article directly follows another. But the different settings of the conveying speeds, in conjunction with guides to be provided for forming the single conveying stream and pushing together the articles of all the conveying means so that the unitary conveying stream forms, makes it possible to rotate the articles coming from the individual rows about their vertical axis. This is necessary whenever the articles in the various rows of a pallet layer are aligned differently in terms of their position about their vertical axis. The articles, by moving together during the formation of the single conveying stream, pass with part of their resting surface onto an adjacent band; an article resting on two bands simultaneously thereby experiences two conveying speeds, with the result that the article is rotated about its vertical axis. Thus, all the articles fed in different rows of a pallet layer and originally possibly in a differing arrangement in relation to their vertical axis are finally in uniform alignment within the single conveying stream.

Insofar as the individual pallet layers cannot shift relative to one another, for example because there is an anti-slip intermediate layer, depalletisation can be obtained, for example, by bringing into action on the front side of the articles facing the individual conveying means a lifting device, for example a suction device, by means of which the articles can be tilted about their rear lower edge, so that a pure lifting means can engage under them and transfer them to the following individual conveying means. Alternatively, however, there is also the possibility of lifting a complete pallet layer by applying an overpressure on the underside. The pallet layer can thus be suspended virtually on an air cushion, so that a pure lifting device can then likewise engage under it and convey it further.

Moreover, expedient developing measures relating to the process can be seen, at least incidentally, from the following illustrations of the installation according to the invention.

In apparatus terms, the set object mentioned above is achieved by means of an installation which is characterized by at least one depalletising station for the depalletisation of pallets, each with articles of a single sort of article, in layers and preferably according to articles within a layer, at least one individual conveying means, especially as a band conveyor, behind each depalletising station, for receiving the depalletised articles and for transferring them in the direction of a following sort-conveying means, especially as a roller conveyor, with its own sort store, and at least one group-forming station with a group-conveying means preceding this and likewise especially as a roller conveyor, for transferring articles from the sort-conveying means to the group-forming station.

As already mentioned above in conjunction with the process according to the invention, by means of an installation so designed the sought-after rearrangement of articles palletised according to sorts to form groups of specific sort composition can be carried out without difficulty. This installation can be operated automatically and continuously with the use of conventional control elements and control devices, so that the desired rearrangement can be executed in a highly efficient way. It is merely necessary to ensure the continuous feed of pallets with articles palletised according to sorts and the discharge of the formed groups, together with their bases, including the feed of the bases. Moreover, it is possible at any time to change the rearrangement over from one composition of the groups to another group composition, without having to convert the installation as a whole in any way; for this, it is merely necessary to take action on the obviously associated control unit, so that there is a different call-up of articles from the sort stores and therefore to the group-forming stations in accordance with the changed composition.

In an expedient development, there should be the provision that each depalletising station be followed by as many individual conveying means parallel to one another as there are rows of articles lying next to one another within a pallet layer transversely relative to the individual conveying means. Such a design affords special advantages, particularly when articles are deposited in a differing arrangement relative to the vertical axis of the articles. Indeed, this design then at the same time allows the plurality of individual conveying means to operate at different conveying speeds, in such a way that the depalletised articles received by the plurality of individual conveying means can be conveyed further, without colliding with one another, on the one hand, and all the articles can have an identical alignment in relation to their respective vertical axis, on the other hand. Such an identical alignment of all the articles makes easier their intermediate storage in the following sort stores and moreover also their further transport.

To simplify the feed of the depalletised articles to the sort conveyors, it is expedient, in another development, if the plurality of individual conveying means, in the region of the end of their conveying zone, are arranged together between two lateral guides which are located in the conveying region of the articles and the mutual spacing of which is reduced continuously to the transport width of the articles. Thus, a single conveying stream of uniform width can form and considerably simplifies the feed to the sort stores and the intermediate storage located there. Moreover, the combination to form a single conveying stream affords the possibility, by means of a following single multiple conveyor switch, of feeding the conveying stream now to one sort store and now to the other, each time according to the sort just depalletised.

In a development, various alternative designs are provided for depalletisation, the simplest of these certainly being a slide to be provided at each depalletising station and intended for pushing a pallet layer down onto the following individual conveying means. If such a pushing down is impossible, for example because there is an anti-slip underlay between the individual pallet layers, the articles of the various pallet layers have to be raised. This can be carried out, for example, by means of a suction device, especially a suction device acting on the individual articles on two sides. On the other hand, however, just as appropriate is a suction device which acts on only a single face of the articles and by means of which the articles are then first to be raised on the front side, so that a lifting appliance, such as, for example, a lifting fork, can be introduced under an article, in order then to raise it as a whole and transfer it to the following individual conveying means. A further alternative involves providing a compressed-air device, via which compressed air can be conveyed onto the underside of the articles to be palletised especially onto the underside of a complete pallet layer to such an extent that the articles or the pallet layer can be lifted as a whole, for example particularly by means of a lifting fork once again.

The invention is explained in detail below by means of an exemplary embodiment of the installation according to the invention, with reference to the drawings; in these:

DESCRIPTION OF A PREFERRED EMBODIMENT

Figure 1:
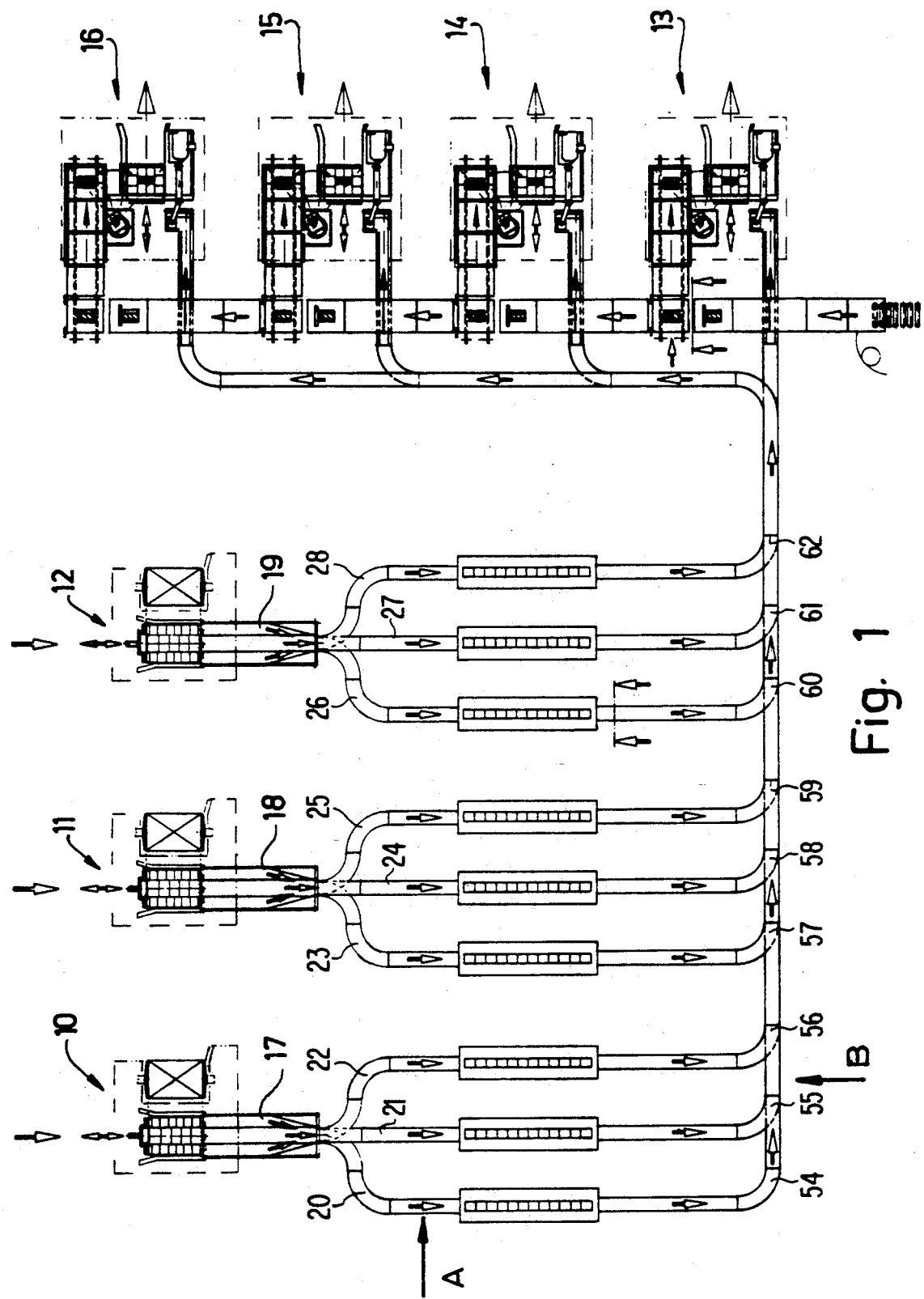
FIG. 1 shows a top view of an installation according to the invention with three depalletising stations, each with three following sort stores, and with four group-forming stations.

FIG. 1 shows a general representation of an installation according to the invention with three depalletising stations 10, 11 and 12 and four group-forming stations 13 to 16. Each of the depalletising stations 10, 11 and 12 is followed by a respective multi-bands conveyor 17, 18 and 19. These multiple conveyors 17 to 19 each lead to three sort conveyors 20 to 22 and 23 to 25 and 26 to 28 which themselves each lead to a sort store 29 to 37 and through these into the region of four group-conveying means 38 to 41. In view of the four group-forming stations 13 to 16, four group-conveying means 38 to 41 are provided, that is to say one group-conveying means for each group-forming station.

Figure 4:
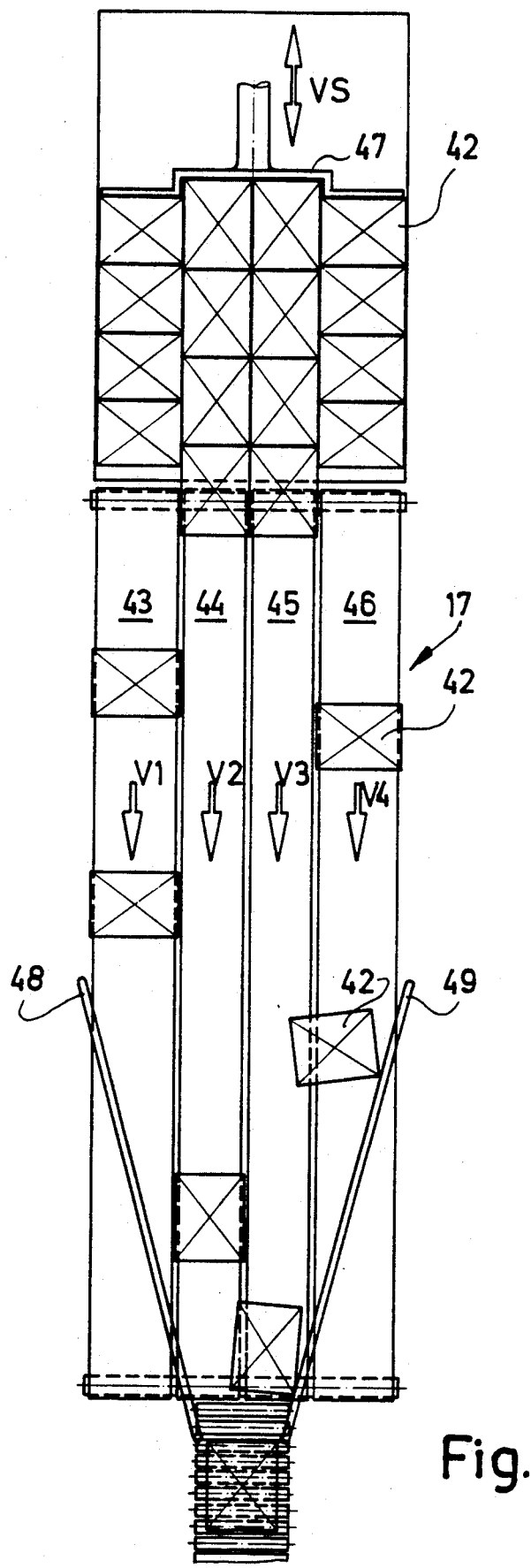
FIG. 4 shows an enlarged representation of a depalletising station with four following individual conveying means.

FIG. 4 illustrates in more detail a depalletising station with an associated multiple conveyor, that is to say, for example, the depalletising station 10 and the associated multiple conveyor 17. A pallet loaded with articles 42 is introduced into the depalletising station 10 and is to be depalletised via four parallel conveyor bands 43 to 46 of the multiple conveyor 17. In the embodiment illustrated, for depalletisation there is a slide 47 movable to and fro which is arranged behind the pallet and by means of which the individual articles 42 can be pushed off onto the conveying means 43 to 46 designed as band conveyors. FIG. 4 shows already different articles 42 as lying on the conveyor bands 43 to 46; it is evident from this illustration how, for example, an article 42 running on the conveyor band 46 and entering the region of contraction between two lateral guides 48 and 49 is pivoted about its vertical axis during further movement, so that it finally assumes the position which can be seen at the end of the conveying zone of the conveyor bands 43 to 46.

The two lateral guides 48 and 49 are arranged at their origin at such a distance from one another that all the conveyor bands 43 to 46 can run through under their catchment region, whilst at the other end of the two lateral guides 49 and 48 the distance between them is narrowed approximately to the transport width of the articles 42.

The conveyor bands 43 to 46 run at associated band speeds V1 to V4; the slide 47 is actuated at a speed Vs.

Assuming, for example, an article length of 225 mm and a desired output of the installation of 24 to 28 groups to be formed per minute, and further assuming the use of three depalletising stations and idle times for the return movement of the slide into the initial position of 0.5 seconds, for the pivoting away of an intermediate layer between the pallet layers of 2 seconds, for the backward pivoting of gripper arms of 2 seconds and for the build-up of an air cushion for raising the pallet layers of 0.5 seconds, that is to say a total idle time of 5 seconds, the following results are obtained. 90 articles can be unloaded from, for example, four layers within 60 seconds − 4×5 seconds = 40 seconds. 10 seconds are therefore available for unloading a layer of 1200 mm, so that Vs is obtained as 0.12 m/s.

A problem to be borne in mind is as follows: the two outer articles, namely those on the conveyor bands 43 and 46, must, until the inner articles, namely those on the two conveyor bands 44 and 45, are grasped by their associated conveyor bands, be advanced until they are no longer overtaken by the inner articles.

Vs = 120 mm/s corresponds to 37 mm in approximately 0.3 s.

Conveyor band 43 (slowest conveyor band):

0.3 s results in 1800 mm/s on the assumption of a conveying zone of 600 mm.

Conveyor band 44 must have in relation to the conveyor band 43 a conveying-distance lead of 300 mm with a conveying zone of the conveyor band 43 of 2400 mm.

Conveyor band 44:

Conveyor band 43 covers a distance of 2400 mm in 1.33 s, whilst conveyor band 44 covers a distance of 2700 mm in the same time. This means that the conveyor band 44 runs at V2 equal to 2025 mm/s.

Conveyor band 45:

2700 mm (conveyor band 44) and 300 mm, that is to say a total of 3000 mm, must be covered in 1.33 s. This means that the conveyor band 43 runs at V3 = 2300 mm/s.

Conveyor band 46:

This conveyor band runs at Vs = 2075 mm/s.

Figure 2:
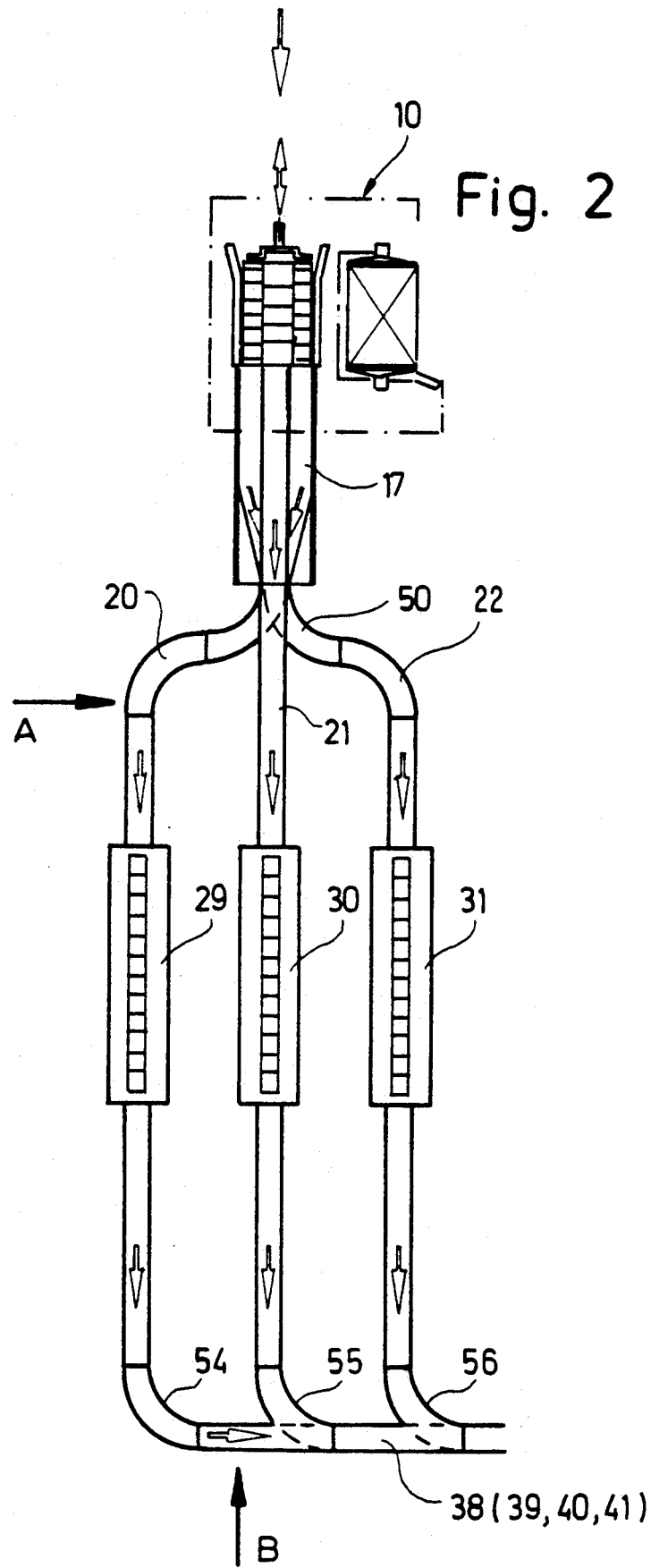
FIG. 2 shows part of the installation of FIG. 1.
Figure 5:
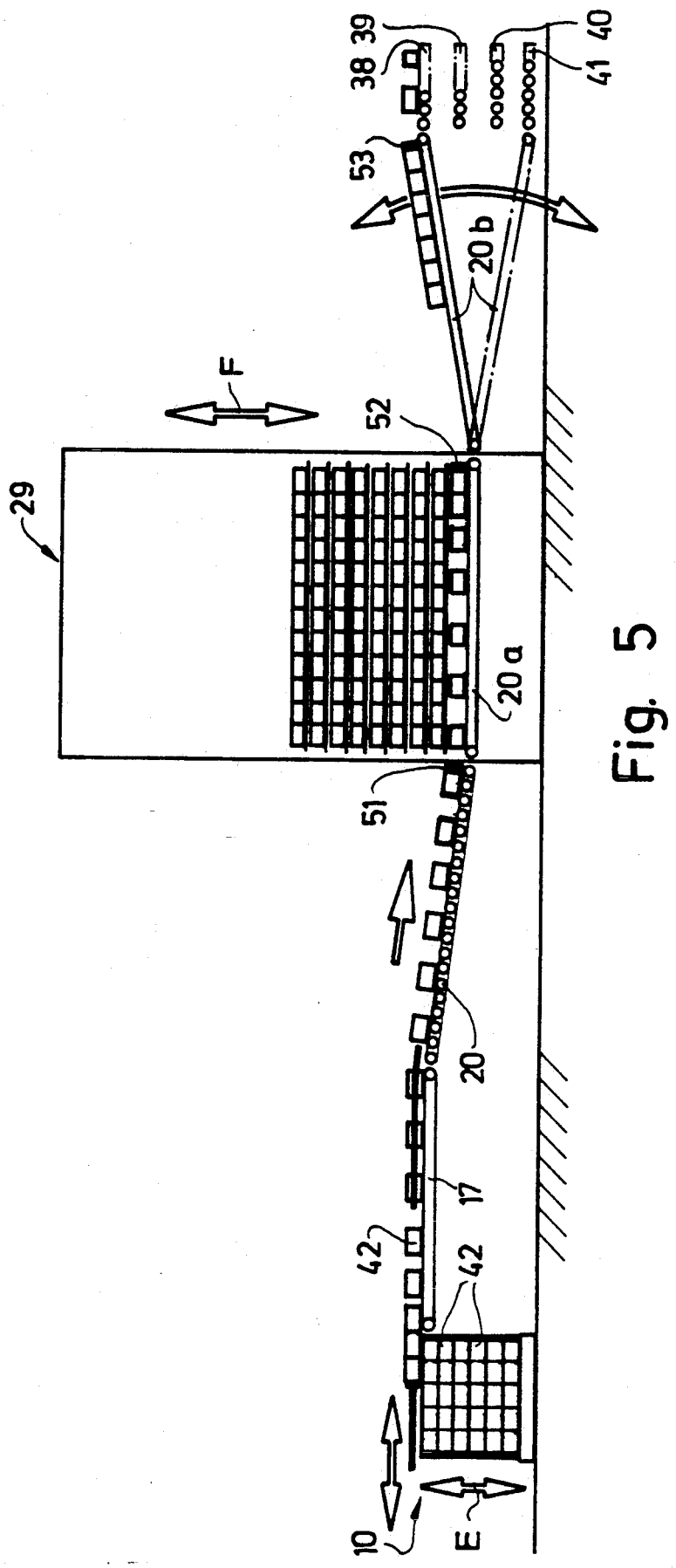
FIG. 5 shows the part of FIG. 2 in a diagrammatic side view from the direction of the arrow A.

FIG. 5 shows the part of FIG. 2 in a diagrammatic side view from the direction of the arrow A. The merely diagrammatically illustrated depalletising station 10 with its slide 47 movable to and fro can be seen clearly. Of course, the pallet has to be raised after each pallet layer has been depalletised; this is indicated by means of the arrow E. The multiple conveyor 17 which, according to the representation of FIG. 4, consists of four individual conveyors 43 to 46, can also be seen. The merely diagrammatic representation of FIG. 2 gives the impression that there are only three individual conveyors; in actual fact, however, four individual conveyors are provided in view of the four rows of each pallet layer which can be seen lying next to one another. The multiple conveyor 17 merges, via a conveyor switch 50 not visible in FIG. 5, but shown diagrammatically in FIG. 2, into the sort conveyors 20 to 22, of which only the sort conveyor 20 can be seen in FIG. 5. At the end of the sort conveyor 20, particularly immediately in front of the associated sort store 29, there is a barrier 51. This barrier 51 serves, via the sort conveyor 20 designed as a roller zone, to obstruct articles fed to the sort store 29, at the entrance to the sort store 29, as long as the latter is prevented from the instantaneous reception of articles 42 as a result of a lifting or lowering movement in the direction of the arrow F. Within the sort store 29, the sort conveyor 20 continues as a rotating conveyor band 20a, via which the articles 42 fed after the removal of the barrier 51 can be introduced into the sort store 29. A barrier 52 is also provided at the end of the conveying zone of the conveyor band 20a located within the sort store 29. This barrier 52 serves for stopping the fed articles 42 from coming out of the sort store 29. The sort store 29 is designed as a rack-type store and is described in more detail further below with reference to FIG. 8. After the sort store 29, the sort conveyor 20 continues as a provided at the end of the conveying zone. This barrier 53 serves for preventing articles 42 located on the rotary conveyor 20b from running further in the direction of the group conveyors 39 to 41 which are each assigned to one of the group-forming stations 13 to 16.

Figure 6:
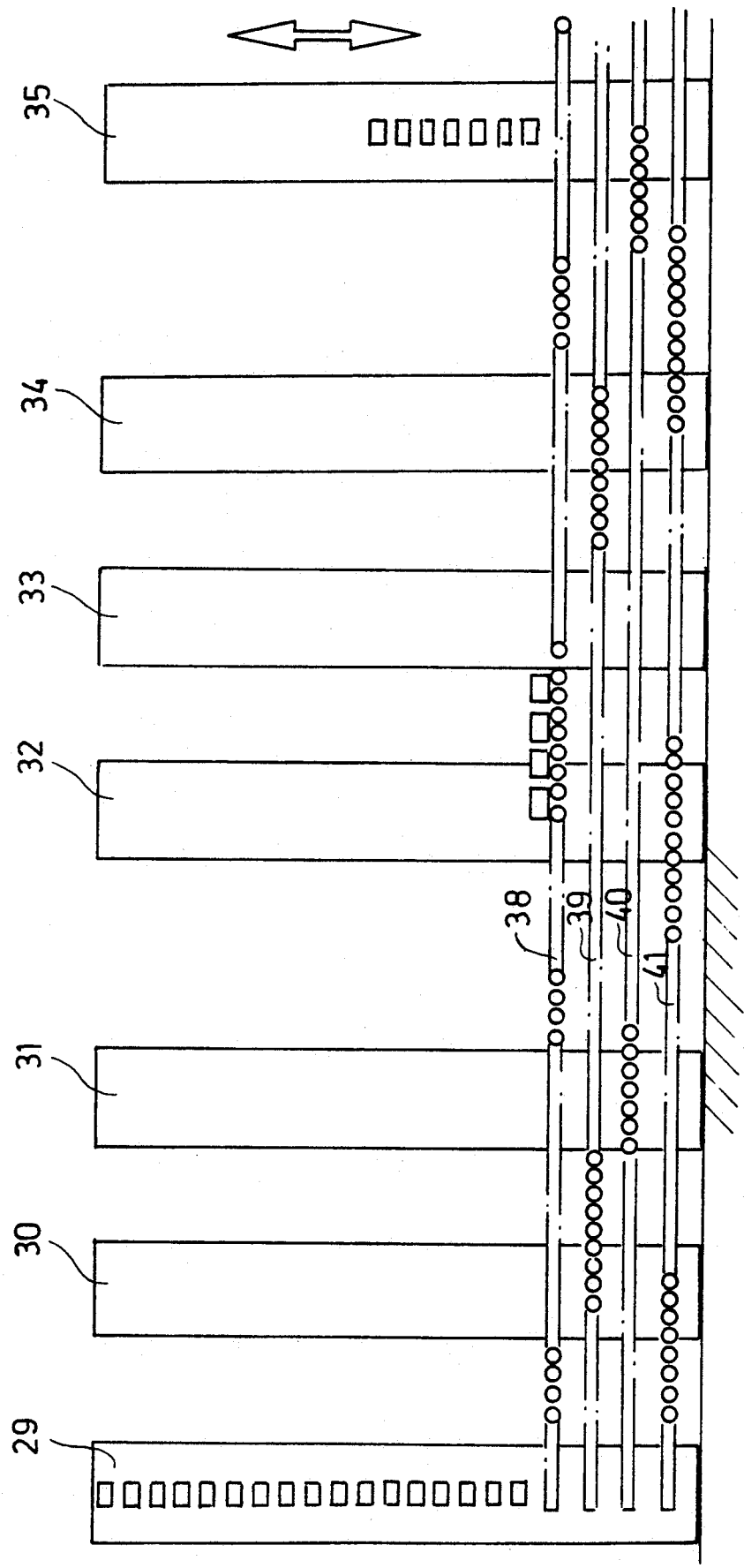
FIG. 6 shows the left-hand part of the installation according to FIG. 1 in a diagrammatic side view from the direction of the arrow B.
Figure 7:
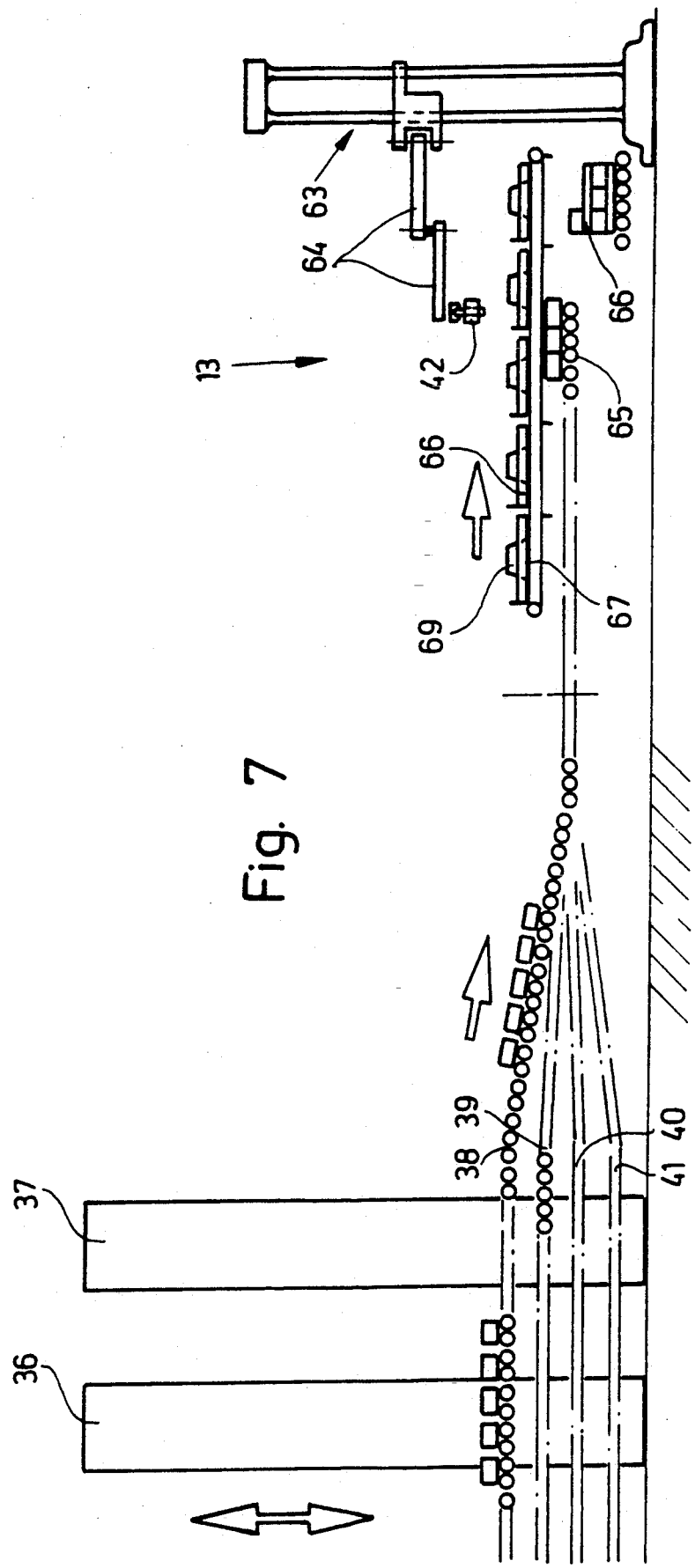
FIG. 7 shows the right-hand part of the installation according to FIG. 2 in a diagrammatic side view from the direction of the arrow B.

FIGS. 6 and 7 together show a view of the entire installation of FIG. 1 from the direction of the arrow B. The sort stores 29 to 31, 32 to 34 and 35 to 37 assigned respectively to the depalletising stations 10 to 12 can be seen clearly here. The group conveyors 38 to 41 assigned to all the sort stores 29 to 37 and designed as roller conveyors can also be seen. These group conveyors 38 to 41 serve for receiving the number of articles 42 of the various sorts which is necessary for forming a group, that is to say articles from the particular relevant sort stores 29 to 37. The release of articles 42 from the sort stores 29 to 37 takes place under the effect of an appropriate control unit so that, with the sequence necessary for group formation being maintained, the requisite number of articles 42 of the various sorts is released from the sort stores 29 to 37, in such a way that, at the latest after the last sort store 37, all the individual articles 42 necessary for forming a group rest in a so-called close-packed position on one of the group conveyors 38 to 41, specifically that of the group conveyors 38 to 41 leading to that group-forming station 13 to 16 in which the particular relevant group is later to be formed. For releasing to the group conveyors 38 to 41 the articles which are to be called up from the individual sort stores 29 to 37, there are conveyor switches 54 to 62 which are provided at the end of the rotary conveyor 20b evident in FIG. 5 and constituting a continuation of the sort conveyor 20 and which can be seen in FIG. 1 and FIG. 2. These conveyor switches 54 to 62 can be produced in such a way that the respective associated rotary conveyor, that is to say, for example, the rotary conveyor 20b for the sort store 29, is vertically pivotable.

Finally, FIG. 7 shows, in the right-hand part, a group-forming station, for example the group-forming station 13. At each of the group-forming stations 13 to 16, in the way shown there is a lifting and pivoting unit 63 serving receiving and depositing purposes and with a pivoting arm 64 movable up and down for grasping a fed article 42 from a supply region 65 and for depositing it on a base 66 of a group of articles 42 to be formed. The group formation takes place at the same time in the position in which a pallet is built up from finished groups. This means that pallet formation takes place as it were in layers by composing a group on the preceding one. The bases 66 are brought into the working region via a branch-off conveyor 67. The bases 66 are fed to the branch-off conveyor 67 via the base conveyor 68 clearly evident in FIG. 3.

Figure 3:
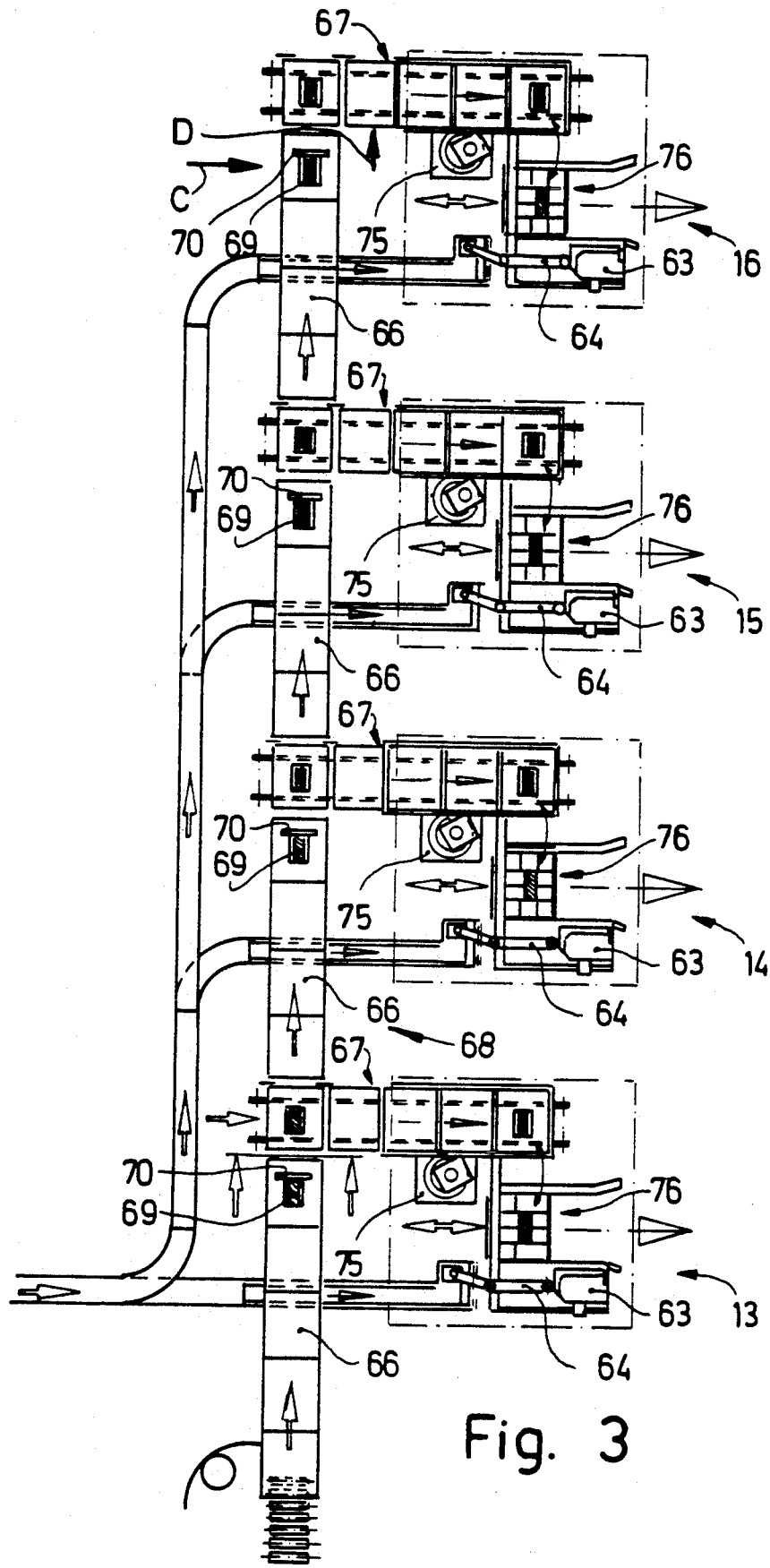
FIG. 3 shows another part of the installation of FIG. 1.

As can be seen especially in FIG. 3, but moreover also in FIG. 7, the bases 66, in their central region, possess an elevation 69, on which barriers 70 provided on the base conveyor 68 take action during the transport of the bases 66 on the latter, in order to control the transport of the bases 66 on the base conveyor 68 and the transfer to the branch-off conveyor 67.

Figure 8:
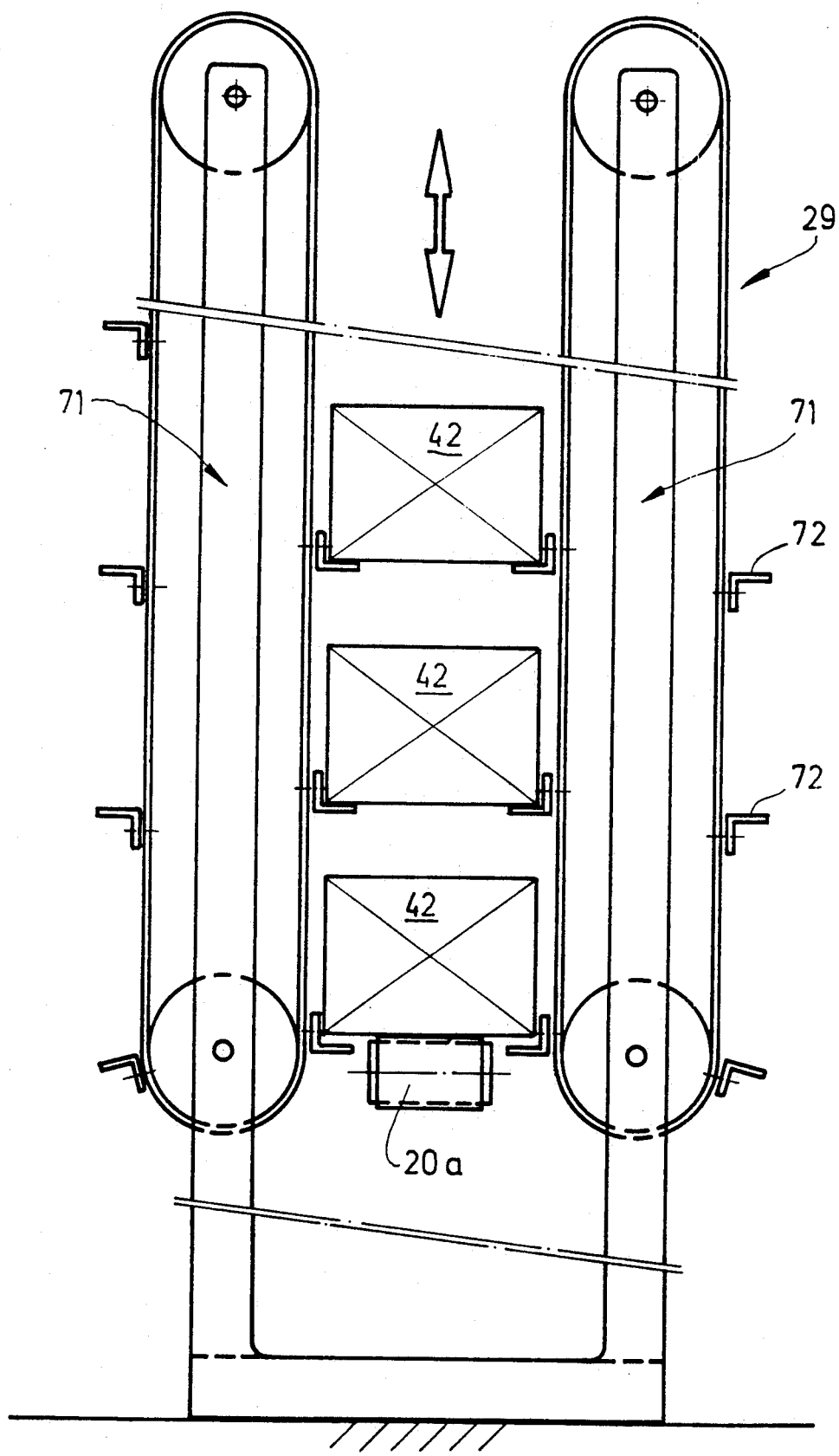
FIG. 8 shows a front view of a sort store.

The sort store 29 shown in FIG. 8 in a view from the direction of the arrow B of FIG. 2 reveals, in the lower part, the rotary conveyor 20a, evident from FIG. 5, which forms the continuation of the sort conveyor 20 and which is a fundamental integral part of the sort conveyor as a whole. All the sort stores 29 to 37 are designed in the same way as the sort store 29 as rack-type stores and for this purpose possess two rotary mechanisms 71 with a plurality of drivers 72. These drivers 72 serve for receiving articles 42 from the rotary conveyor 20a and, arranged at an appropriate height within the sort store 29, for forming intermediate storage racks. The articles 42 received in the racks can be brought further upwards as a result of an appropriate movement of the rotary mechanisms 71 of the sort store 29 or downwards as a result of a movement in the opposite direction, in order finally to deposit articles 42 once again on the rotary conveyor 20a which moreover at the same time forms a run-through rack of the sort store 29.

Figure 9:
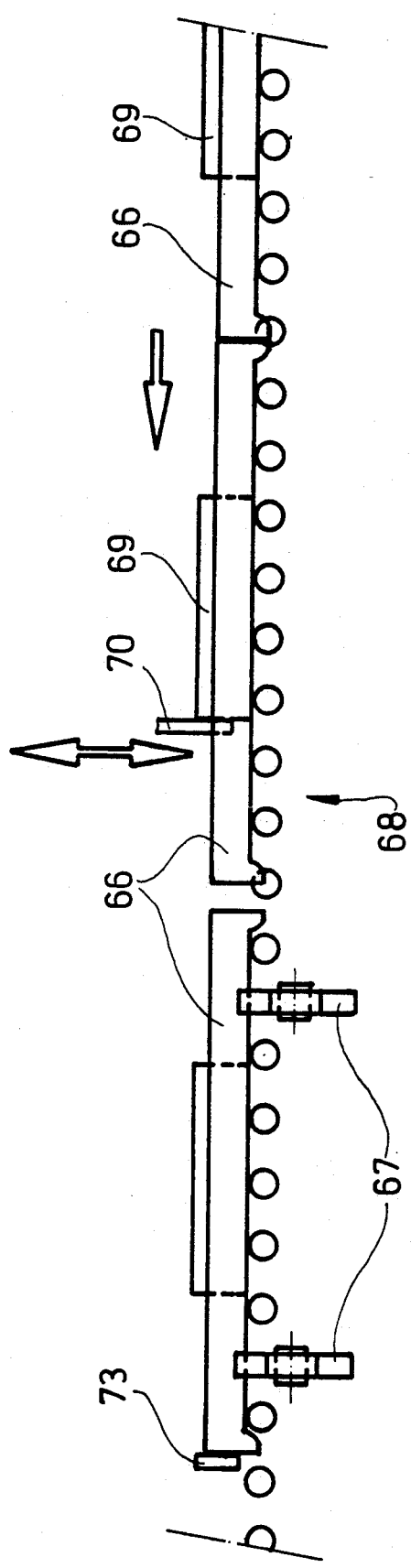
FIG. 9 shows the conveying means for the bases in a diagrammatic side view from the direction of the arrow C.

FIG. 9 shows a part view of the base conveyor 68 from the direction of the arrow C of FIG. 3. This is designed as a roller-conveyor track and serves for feeding the bases 66 equipped with a central elevation 69 to the individual group-forming stations 13 to 16. In the region of each group-forming station 13 to 16, there is a branch-off conveyor 67 which takes over the bases 66 from the base conveyor 68. For controlling the correctly timed take-over of the bases 66 from the base conveyor 68 by the branch-off conveyor 67, there are, on the one hand, the barriers 70 already shown in FIG. 3 and, on the other hand, further barriers 73. Thus, the barriers 73 constitute a stop against the further running of a base 66 beyond the junction of the branch-off conveyor 67, whilst the barriers 70 constitute a barrier against the further transport of bases 66 to one of the branch-off conveyors 67. The branch-off conveyors 67 are appropriately designed as toothed-belt conveyors, the toothed belts not shown in detail being guided via rotating rollers.

Figure 10:
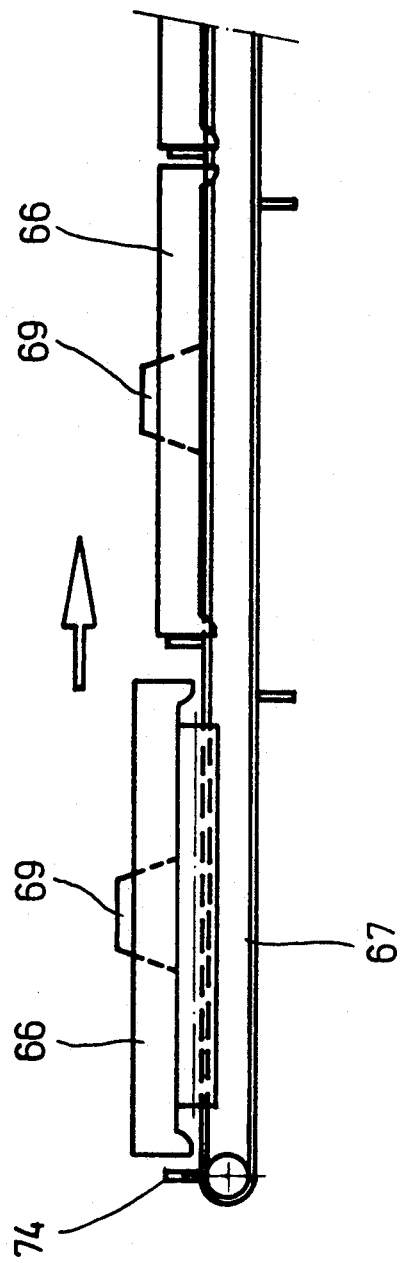
FIG. 10 shows a branch-off conveyor for the bases in a diagrammatic side view from the direction of the arrow D.

FIG. 10 shows a portion of a branch-off conveyor 67 from the direction of the arrow D of FIG. 3. There can be seen, at the same time, the toothed belts which have already been mentioned in conjunction with FIG. 9 and which, guided via deflecting rollers, form the branch-off conveyor 67. In the way shown, the bases 66 are guided by means of the branch-off conveyor 67 up against a stop 74 provided at the end of the latter. The particular base 66 bearing against the stop is grasped by means of a lifting and pivoting unit 75 evident from FIG. 3 and serving transfer purposes, is lifted off from the branch-off conveyor 67 and is deposited in the pallet- or group-forming region 76 which can be seen in FIG. 3 and in FIG. 7.

I claim:

1. A system for handling articles of different types comprising:
   a) a plurality of depalletising stations (10 to 12);
   b) means for removing a layer of articles (42) from a pallet, said removing means associated with each of the plurality of depalletising stations;
   c) a plurality of band conveying means (17 to 19), each of the plurality of conveying means comprising a plurality of conveying bands (43–46);
   d) a plurality of sort conveying means (20-22, 23-25, 26-28), each of the plurality of sort conveying means being parallel to one another;
   e) a plurality of sort stores (29 to 37), each of the plurality of sort stores being parallel to one another;
   f) at least one group-forming station (13 to 16); and
   g) group conveying means (38 to 41) for transporting articles (42) from the sort conveying means (20 to 28) to the at least one group forming station (13 to 16);

wherein each of the plurality of depalletising stations has associated therewith one of said band conveying means, each band conveying means has associated therewith a subset of said plurality of sort conveying means, the band conveying means conveying an article removed from the pallet by the removing means to one of the plurality of sort conveying means in the associated subset, and each sort conveying means has associated therewith a sort store for temporarily holding articles.

2. The system according to claim 1, characterized in that each band conveying means comprises as many conveying bands (43 to 46) arranged parallel to one another as there are rows of articles (42) within a pallet layer.

3. The system according to claim 2, characterized in that each of the plurality of conveying bands (43 to 46) can be driven at a different conveying speed from that of the others, in such a way that the depalletised articles (42) received by the plurality of conveying bands (43 to 46) can be conveyed, without articles (42) transported on mutually adjacent conveying bands (43 to 46) colliding with one another.

4. The system according to claim 3, characterized in that the plurality of conveying bands (43 to 46), at one of the ends thereof, are arranged together between two lateral guides (48, 49) which are located in a conveying region and which are mutually spaced apart by a distance that is reduced continuously, along a direction in which articles are conveyed on the plurality of conveying bands, to a distance that is substantially equal to the width of the articles (42).

5. The system according to claim 4, characterized in that adjacent the lateral guides (48, 49) there is a number, corresponding to the number of sorts of articles to be depalletised in a depalletising station (10 to 12), of sort conveying means (20 to 22, 23 to 25, 26 to 28) which adjoin a end region of the lateral guides (48, 49) via a multiple conveyor switch (50).

6. The system according to claim 5, characterized in that at each depalletising station (10 to 12) there is a slide (47) for pushing a pallet layer onto an associated band conveying means (17–19).

7. The system according to claim 1, characterized in that each sort store (29 to 37) comprises a stacker (71, 72), a conveying-zone portion (20a) of said sort conveying means forming a bottom-most run-through portion of the stacker and extending beyond the sort store (29 to 37).

8. The system according to claim 7, characterized in that the stacker consists of two oppositely movable rotary mechanisms (71) with drivers (72) which receive the articles (42) and move them to a higher plane and when, as required, the drivers are moved in an opposite direction, deposit articles (42) onto said conveying-zone portion (20a) of the sort conveying means (20).

9. The system according to claim 1, characterized in that there are a plurality of group conveying means (38 to 41) and a plurality of group-forming stations, and in that each of said group conveying means (38 to 41) are associated with a subset of said plurality of sort stores (29 to 37), there being as many group conveying means (38 to 41) as there are group-forming stations (13 to 16).

10. The system according to claim 9, characterized in that each of the plurality of group conveying means (38 to 41) are arranged one above another.

11. The system according to claim 10, characterized in that each sort conveying means (20 to 28) is connectable to each of the group conveying means (38 to 41) via a conveyor switch (55 to 63).

12. The system according to claim 9, characterized in that each group-forming station (13 to 16) has a first conveyor track (68) for feeding group bases (66) and a second conveyor track for feeding articles (42) from the plurality of group conveying means (38 to 41) into respective working regions of a lifting and pivoting unit (75) for the bases (66) and of a lifting and pivoting unit (63) for the articles (42).

13. The system according to claim 12, characterized in that all the group-forming stations (13 to 16) are adjacent a common first conveyor track (68), from which extends, to each group-forming station (13 to 16), a branch-off conveyor (67) which is guided into the working region of the lifting and pivoting unit (75).

14. The system according to claim 13, characterized in that the first conveyor track (68) is a roller track.

15. The system according to claim 14, characterized in that the branch-off conveyors (67) are belt-drive conveyors.

16. A process of using a system to handle articles of different types, the system including a plurality of depalletising stations (10, 11, 12), each of the plurality of depalletising stations having associated therewith a plurality of sort conveyors (20–22, 23–25, 26–28), the conveyor switch directing an article transported from the depalletising station to one of the plurality of sort conveyors, and each sort conveyor having associated therewith a sort store (29–37) for temporarily holding articles, the process comprising the steps of:
   a) successively feeding pallets each containing a single type of article to the depalletising stations;
   b) at the depalletising stations, removing layers of articles from the pallets and transporting the articles to said conveyor switch;
   c) conveying the articles on the sort conveyors to the sort stores so that each sort store contains a single type of article; and
   d) discharging articles from the sort stores and combining the discharge articles into groups containing different types of articles.

17. The process according to claim 16, wherein the system further includes at least one group-forming station (13, 14, 15, 16) associated with the sort stores (29 to 37); further comprising the step of feeding articles discharged from the sort stores to at least one group-forming station (13, 14, 15, 16) to form groups of articles of different types.

18. The process according to claim 17, wherein the system further includes a plurality of multiple-band conveyors (17, 18, 19), each of said plurality of multiple-band conveyors being located between a respective depalletising station (10, 11, 12) and the conveyor switch (50) associated with said respective depalletising station, further comprising the steps of:
   a) combining articles of a single type on one of said plurality of multiple-band conveyors to form a single conveying stream of articles issuing from a depalletising station associated with said one of said plurality of multiple-band conveyors; and
   b) feeding the stream of articles of a single type to one of said plurality of sort stores (29 to 37) via one of said plurality of sort conveyors which is associated with said one of said plurality of sort stores.

19. The process according to claim 18, wherein each multiple-band conveyor has a plurality of conveying bands (43–46); comprising the step of delivering the articles of each row of a pallet layer, during depalletisation, to a conveying band associated with each row.

20. The process according to claim 19, comprising operating each of the plurality of conveying bands associated with a row of articles in the pallet layer at different respective conveying speeds.

21. The process according to claim 20, comprising operating the plurality of conveying bands at respective conveying speeds so that the articles of different rows of a pallet layer are transported on an associated conveying band without colliding with one another.

22. The process according to claim 21, wherein the system includes guides; comprising conveying the articles on the conveying bands past the guides so that the articles are shifted on the conveying bands transversely relative to a direction in which the articles are conveyed on the conveying bands in order to combine the articles so that they form the single conveying stream.

23. The process according to claim 21, comprising depalletising the articles in a raised state.

24. The process according to claim 21, wherein each sort store has a stop at one end; comprising feeding articles into the sort stores and abutting the articles against the stops, raising articles already located inside the sort stores and subsequently feeding additional articles into the sort stores.

25. The process according to claim 17, wherein the system includes a plurality of group-forming stations; comprising releasing articles from the sort stores in an amount and sequence required to fulfil operations performed at the group-forming stations.

26. The process according to claim 25, comprising feeding bases to the group-forming stations.

27. The process according to claim 26, comprising elevating, pivoting and subsequently depositing articles on the bases.

28. The process according to claim 27, comprising palletising groups of articles which are supported on respective bases.

29. A system for handling articles of different types comprising:
a) a plurality of depalletising stations including means for removing layers of articles from pallets;
b) a plurality of multiple-band conveyors for conveying articles from the depalletising stations;
c) a plurality of sort conveyors;
d) a plurality of conveyor switches, each of the plurality of conveyor switches being located between a respective multiple band conveyor and said plurality of sort conveyors; and
e) a plurality of sort stores;
wherein each of the plurality of depalletising stations has associated therewith a multiple-band conveyor and a conveyor switch, each conveyor switch has associated therewith a plurality of sort conveyors, the conveyor switch directing an article, transported by the multiple-band conveyor, from the depalletising station to one of the plurality of sort conveyors, and each sort conveyor has associated therewith a sort store for temporarily holding articles.

30. The system according to claim 29, wherein each sort store has a horizontal conveying-zone portion (20a).

31. The system according to claim 30, further comprising:
a plurality of group conveyors (38–41); and
a plurality of transfer conveyors (20b), each transfer conveyor (20b) being associated with a respective one of said plurality of sort stores for transferring the articles from the respective one of said plurality of sort stores to one of said plurality of group conveyors.

32. The system according to claim 31, further comprising a plurality of conveyor switches (54–62) for connecting each transfer conveyor (20b) to one of the plurality of group conveyors (38–41).

33. The system according to claim 31, wherein:
each of said plurality of group conveyors (38–41) are horizontal and are disposed one above another; and
each of said plurality of transfer conveyors (20b) have one end which is vertically pivotable into a position adjacent one of said plurality of conveyor switches (54–62) at a time, each of said plurality of conveyor switches (54–62) being associated with a respective one of the group conveyors (39–41).

34. The system according to claim 31, further comprising a group-forming station (13–16) located adjacent each of said plurality of group conveyors (39–41).

35. The system according to claim 29, further comprising:
a) a plurality of group-forming stations (13 to 16); and
b) group conveying means (38 to 41), located adjacent said group-forming station, for conveying the articles to be formed into a group, from the sort stores (29 to 37) to said plurality of group-forming stations (13 to 16).

36. The system according to claim 35, further comprising a plurality of sort conveying means (20b) which correspond in number to said plurality of sort conveyors (20 to 28), each of said plurality of sort conveying means being associated with one of said plurality of sort stores (29 to 37), and wherein said plurality of sort conveying means are connectable to different ones of the group conveying means (38 to 41) via conveyor switches (54 to 62) located between said plurality of sort conveying means and said group conveying means.

* * * * *